(12) United States Patent
Malione

(10) Patent No.: US 6,341,016 B1
(45) Date of Patent: Jan. 22, 2002

(54) METHOD AND APPARATUS FOR MEASURING THREE-DIMENSIONAL SHAPE OF OBJECT

(76) Inventor: Michael Malione, P.O. Box 431, San Francisco, CA (US) 94104

(*) Notice: Subject to any disclaimer, the term of this patent is extended or adjusted under 35 U.S.C. 154(b) by 0 days.

(21) Appl. No.: 09/633,522

(22) Filed: Aug. 4, 2000

Related U.S. Application Data

(60) Provisional application No. 60/147,660, filed on Aug. 6, 1999.

(51) Int. Cl.[7] ............................................. G01B 11/24
(52) U.S. Cl. ........................ 356/603; 356/623; 345/419
(58) Field of Search ................................. 356/601, 602, 356/603, 606, 607, 608, 614, 622, 623, 609; 354/76, 77, 113; 250/559.22, 559.23; 348/42, 47; 345/426, 427, 425, 419

(56) References Cited

U.S. PATENT DOCUMENTS

| | | | |
|---|---|---|---|
| 4,630,910 A | * 12/1986 | Ross et al. | 354/76 |
| 4,648,717 A | * 3/1987 | Ross et al. | 356/376 |
| 4,802,759 A | * 2/1989 | Matsumoto et al. | 356/376 |
| 5,608,529 A | * 3/1997 | Hori | 356/376 |
| 6,252,623 B1 | * 6/2001 | Lu et al. | 348/47 |
| 6,268,863 B1 | * 7/2001 | Rioux | 345/427 |

FOREIGN PATENT DOCUMENTS

JP          09021620      * 1/1997

* cited by examiner

Primary Examiner—Hoa Q. Pham
(74) Attorney, Agent, or Firm—Francis Law Group

(57) ABSTRACT

A method for determining the three-dimensional characteristics of an object, comprising the steps of illuminating at least a surface portion of the object with radiant energy, the radiant energy being directed through a color pattern to provide a first color image, the color pattern including a plurality of substantially vertical color strips, each of the color strips having varying hue; obtaining at least one first two-dimensional image of the illuminated surface portion of the object at a first position, the illuminated surface portion including the first color image; illuminating the surface portion of the object with a second light, the second light comprising substantially white light, the second light providing a second light image; obtaining at least one second two-dimensional image of the surface portion of the object illuminated by the second light, the two-dimensional image being obtained at the first position; determining the originated hue in the color pattern at a plurality of points in the first color image; determining a tag for each of the points in the color image; determining the position of each of the points on a respective one of the tags, and triangulating the point positions to generate a three-dimensional model of the surface portion of said object.

9 Claims, 7 Drawing Sheets

(3 of 7 Drawing Sheet(s) Filed in Color)

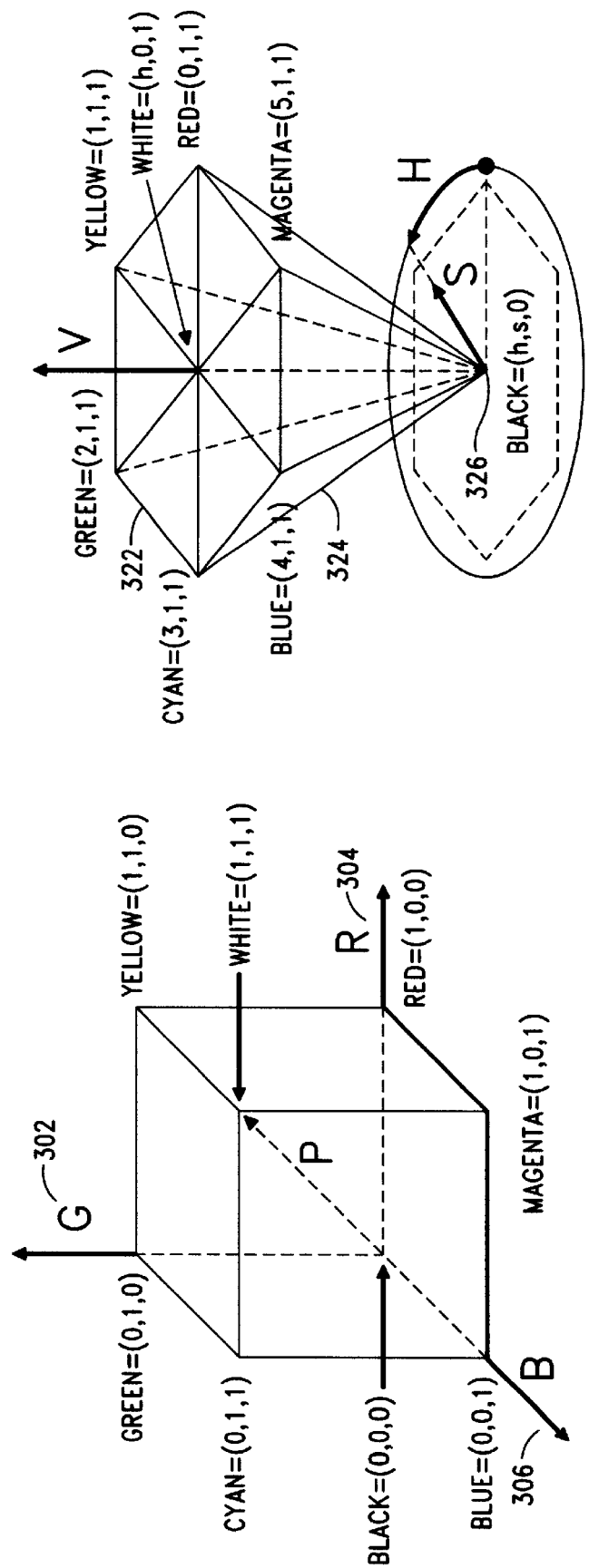

FIG.-6

METHOD AND APPARATUS FOR MEASURING THREE-DIMENSIONAL SHAPE OF OBJECT

This application claims benefit to U.S. provisional application Serial No. 60/147,660, filed Aug. 6, 1999.

FIELD OF THE INVENTION

This invention relates generally to optical scanners for the measurement and reproduction of objects in three dimensions. More particularly, the invention relates to an apparatus and method for generating three-dimensional shape information through the use of two-dimensional images.

BACKGROUND OF THE INVENTION

Various methods and devices have been employed to optically scan the three-dimensional shape of objects. However, as discussed below, the conventional methods and apparatus have inherent drawbacks that impose limitations on the approach and on the quality of the resulting data.

Range from Focus

It is well known that using a high speed image processing computer, the sharpness of an image can be measured in real-time at any point in the image where there is a distinguishable feature. There is a direct relationship between focus and range. Thus, in general, if focus is determined in real-time, range can likewise be determined in real-time. In order to determine the range to a multiplicity of points, the sharpness of focus must be determined for each of those points. In order to obtain this information, many images must be captured with different focal distances. If a part of the image is determined to be in focus, then the range to that part of the image can be easily calculated. The focal length must, in effect, be swept from too close→just right→too far.

The range from focus method has several drawbacks and disadvantages. First, the method requires expensive hardware. The method is also slow because many different focus settings must be used, and at each focus setting, a new image must be captured and analyzed. Furthermore only the range to distinguishable features can be computed.

Time-Of-Flight

Three-dimensional (3D) ranging methods based on the concept of "time of flight" directly measure the range to a point on an object by measuring the time required for a light pulse to travel from a transmitter to the surface and back to a receiver or by the relative phase of modulated received and transmitted signals. The "laser radar" approaches actually scan with a single spot, and effectively measure the range to each point in the image—one point at a time. Since the light beam must scan over the full object, this method requires an extensive period of time to complete.

Active Triangulation

Range finding by triangulation is based on the principal that if a base line and the two angles of a triangle are known the lengths of the other sides may be determined. In a basic form of active triangulation, a beam of light is used to form a bright stripe on an object's surface and a camera displaced a known distance (base line) from the light source views the scene. One angle of the triangle is defined by the angle to the base line of the beam of the light and the other angle is measured via the position of the light strip in the camera (CCD array or lateral effect photodiode).

Active Triangulation Using a CCD Camera

Active Triangulation using a CCD camera generally comprises scanning a plane of light rapidly across a scene or object so that the entire scene is scanned within one frame time. The CCD camera is designed and constructed such that the output values of camera pixels represent the angle at which the scanning line hit the pixels. The geometry of the CCD array provides an additional angle associated with the pixels so the range can be calculated based on these two angles and the length of the base line. The camera pixels are implemented using capacitors which store a given charge before plane light scanning starts and gradually discharge during scanning until the bright line image passes through the pixel. Arithmetic logic is then employed to count the remaining charges on each capacitor and provides angle information at each pixel. This method generally provides high speed and single pixel resolution range image. However, it still requires a scanning plane of light.

Structured Illumination

In structured illumination, a pattern of light, such as an array of dots, strips, or a grid is simultaneously projected onto a scene. However, a major limitation of this method is that each of the stripes in the image must be precisely matched with each of the projected strips. Furthermore, such method cannot achieve single pixel resolution of range image because processing information from a group of pixels is required to determine the location of a structured light element (a dot or a stripe) in the image.

Moiré Contouring

Moiré techniques similarly employ a form of structured light, typically a series of straight lines in a grating pattern, which is projected onto an object in the scene. The projected pattern is then viewed from some other angle through a secondary grating, presenting a view of the first grating line which has been distorted by the contour of the part. To determine the three-dimension contour of the object, moiré techniques based on phase shifting, fringe center mapping, and frequency shifting are employed. The noted shifting and mapping processes do however require extensive software analysis and rigorous hardware manipulation to produce different moire patterns of the same object.

Stereo Vision

A conventional method of measuring a three dimensional (3D) surface profile of objects is stereo vision. A stereo vision system uses at least two cameras to observe a scene similar to human vision. By processing the images from all the cameras, the 3D surface profile of objects in the scene can be computed via triangulation of common features. This requires finding a common feature that is visible in more than one image, which requires extensive computation and artificial intelligence to avoid the confusion of features with one another. As with the range from focus approach, range can only be determined at points in the object where there is a discernable feature, and because this information must be extracted from a group of pixels, it cannot be pixel accurate at every point in a feature. Structured lighting is often applied to the object to produce easily recognizable features where they would otherwise be absent.

Projected Patterns

The problem of ambiguity (i.e., confusion of lines or bands with one another) that typically arises with structured illumination can be alleviated though the careful design of the projected pattern. One "projected pattern" approach involves employing a multitude of patterns that complement one another and coding each specific stripe by way of its appearance under all of the patterns in the set. This does however require the capturing of many images to secure all the patterns.

To achieve single or sub-pixel accuracy in the triangulation or stereo correspondence, uniform stripes in the structured light pattern are replaced with continuously or discretely varying functions in the direction to be triangulated. These functions are applied to the light's intensity, color, or wavelength. Indeed, in some instances, the entire structured light pattern can be one single functional field. Taking the approach to this extreme avoids the problem of multiple patterns, but it seriously compromises the accuracy of the measurement, since the discernable range of intensity, color, or wavelength is being mapped across the entire field of image instead of just a narrow strip.

It is therefore an object of the present invention to provide a photogrammetric alignment method and apparatus that improves, by means of a more effective projection pattern, the quality, performance, and feasibility of all three-dimensional (3D) scanner configurations in which structured illumination is or potentially could be employed.

SUMMARY OF THE INVENTION

In accordance with the above objects and those that will be mentioned and will become apparent below, the photogrammetric alignment method and apparatus in accordance with this invention comprises at least one energy radiation source to illuminate the object in the scene and at least one camera or other type of two-dimensional (2D) image sensor array to obtain at least one image of the object to be scanned. The projection is accomplished by means that produce a projection pattern, such as a conventional projector. In a preferred embodiment, the projector includes a photographic or infrared filtering slide to facilitate the projection of the pattern.

According to the invention, a unique multi-color (i.e., tricolor) projection pattern is generated and employed, which provides both sub-pixel level accuracy in the determination of an illuminated object's two-dimensional position at any point in the light field, and a unique local identification, within the global context of the entire illumination field, of the transverse position of any illuminated area on the object, without requiring a plurality of projections.

In one embodiment of the invention, the projected pattern is used in conjunction with conventional computer vision techniques. In the noted embodiment, at least one region of the object being scanned is illuminated with space modulated (as opposed to time) radiant energy. At least one camera is employed to acquire digital images of the illuminated portion of the object from at least one known position and orientation. Matching features in the photographs are found via digital image processing of the images. These matching features are then processed through conventional triangulation computer vision algorithms to determine the 3D position at each point.

The unique pattern of the invention provides for very precise position measurements by using functions in both the transverse (horizontal) and perpendicular (vertical) direction. In the transverse direction, the pattern comprises a series of vertical bands. The intensity (radiance) of the colored light also varies functionally within each band.

In the perpendicular direction, the hue (expressable as a function of the dominant wavelength) of the illuminating light varies functionally along the band. The hue can also repeat itself more than once along the extent of the projected field to improve the discernable precision of position from hue measurements. In practice, hues are generated by adjusting the relative levels of the tri-color source channels.

The pattern also provides for the exact identification of any local area within the global context of the entire illumination field through a technique, referred to herein as "hue-shift tagging." In this technique, successive bands in the pattern are discerned by a quantified shift in hue at their boundary. Each shift is then measured in terms of a whole number multiple of the smallest allowed shift; the multiple being the hue-shift at each band.

According to the invention, the sequence of hue-shifts across the entire pattern is designed such that a locally discernable "tag", consisting of one to five successive hue-shift values, preferably occurs only once in the entire extent of the pattern. A local analysis of an image under the pattern can thus identify each band of the projected pattern globally.

The "hue-shift tagging" technique makes it possible for the first time to precisely locate matching features for computer vision 3D from widely disparate views. It is the first approach to incorporate functional variation in two separate dimensions, which frees the computer vision process from the constraint that epipolar lines must remain horizontal to the pattern. This greatly reduces the number and proximity of images that need to be acquired.

BRIEF DESCRIPTION OF THE DRAWINGS

The file of this patent contains at least one drawing executed in color. Copies of this patent with color drawings will be provided by the Patent and Trademark Office upon request and payment of necessary fee.

Further features and advantages will become apparent from the following and more particular description of the preferred embodiments of the invention, as illustrated in the accompanying drawings, and in which like referenced characters generally refer to the same parts or elements throughout the views, and in which:

FIG. 3A is an isometric view of a color cube for the RGB (red, green, blue) color space commonly employed in the field of computer graphics to represent the color value in each pixel of an image;

FIG. 3B is an isometric view of a further color space where the colors illustrated in FIG. 3A are represented in HSV (hue, saturation, value);

FIG. 6 is a graphical illustration of vertical hue-ramp bands, according to the invention.

DETAILED DESCRIPTION OF THE PREFERRED EMBODIMENT

Figure 2:
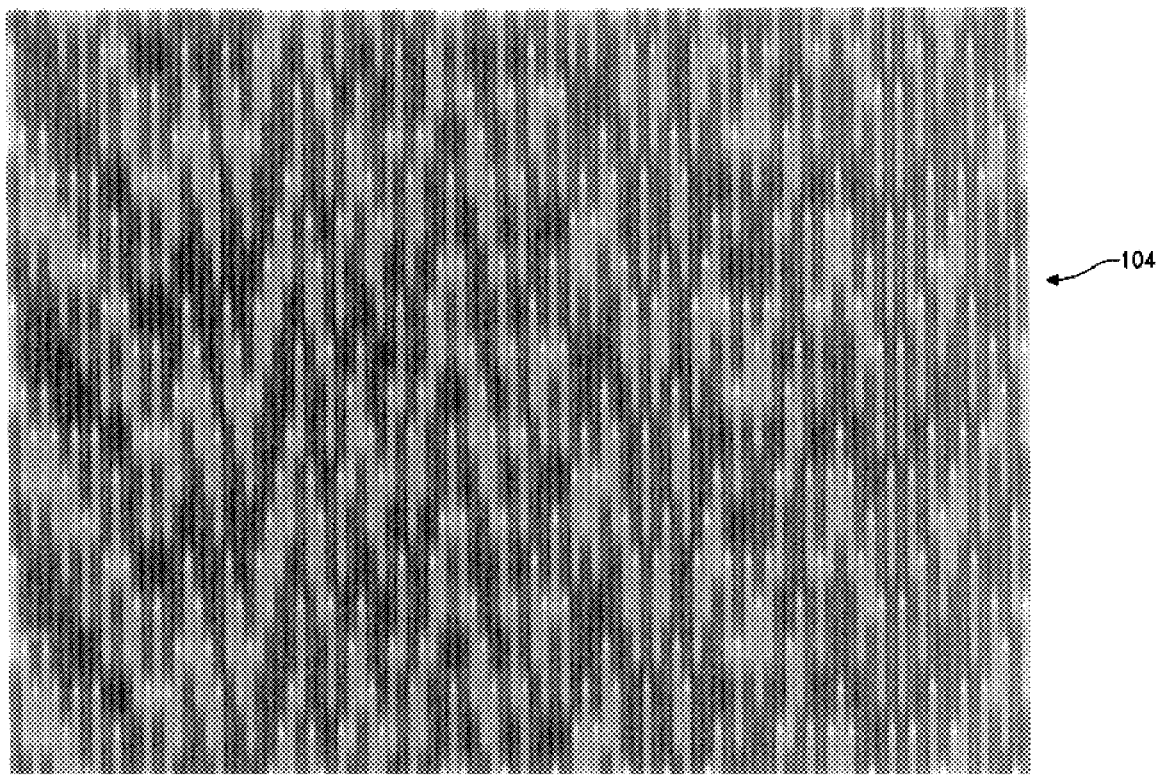
FIG. 2 illustrates an embodiment of the color pattern, according to the invention.

Referring first to FIG. 2, there is shown the unique color pattern 104 of the invention. The color pattern 104 comprises a plurality of substantially vertical stripes or bands 1–100 that uniquely encode the horizontal position of each stripe in the overall pattern via the colors of the stripe itself and those of its close neighbors. In a preferred embodiment of the invention, at least one-hundred (100) stripes are employed. However, as discussed in detail herein, the number of strips employed in a respective color pattern can vary from 3 to 300.

According to the invention, each stripe comprises at least one substantially uniform color. In a preferred embodiment, each stripe has a varying color (measured and, hence, defined as hue) that is a function of the vertical position in the stripe. The radiant intensity of the pattern 104 is preferably linked to the hue as the pattern is traversed in a substantially vertical direction. The intensity may also be modulated by various means and at various values to signify the horizontal position within each band; provided, the hue remains substantially constant (possibly subject to a gamma correction) as any single band is traversed horizontally.

Figure 1:
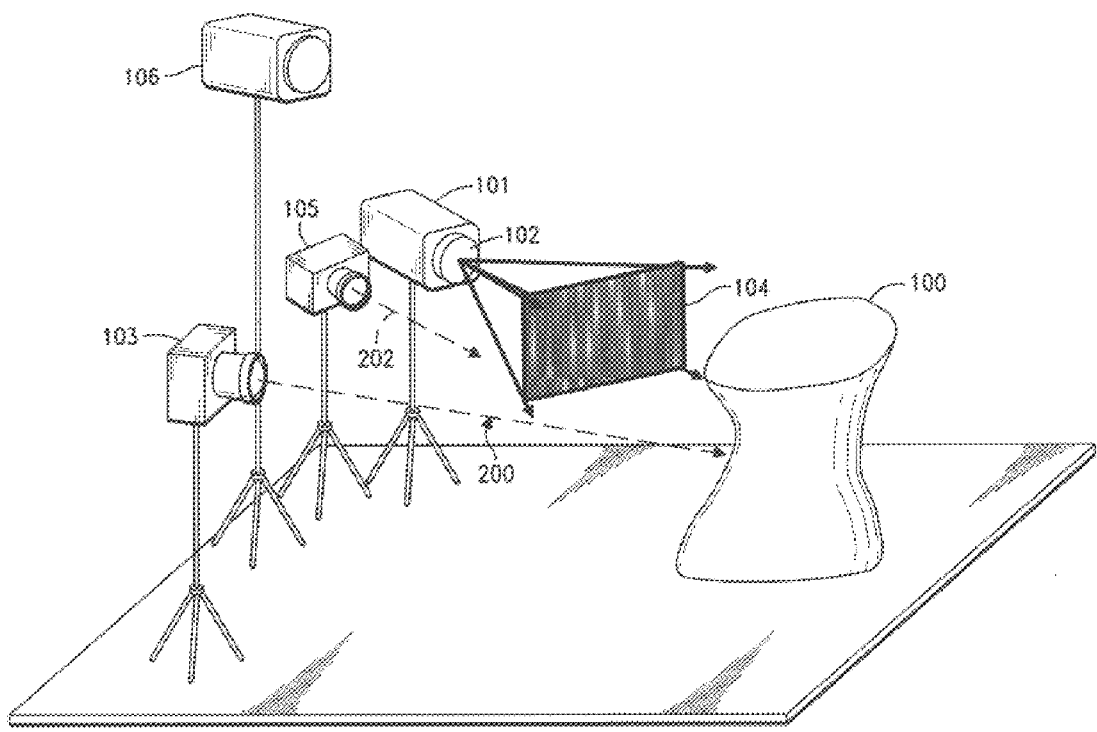
FIG. 1 illustrates an embodiment of a three-dimensional (3D) photographic object scanning system, according to the invention.

Referring now to FIG. 1, there is shown one embodiment of the invention employed for three-dimension (3D) photographic scanning. The object to be scanned 100, is illuminated with radiant energy from at least one projector 101. If there is more than one projector employed, any one may be activated at a time for image capture.

The projector 101 may include a printed color slide, a mosaic of sections made from a linear variable wavelength filter (LVWF) coupled with a periodically varying neutral density filter, or a film onto which is printed three spectrally distinct infrared or visible transmitting layers. The projector 101 further includes a source of radiant energy, which is transmitted through the pattern 104 and preferably focused onto the object 100 by means of a lens 102.

According to the invention, at least one camera 103 or other type of two-dimensional (2D) image sensor array is employed to acquire digital images of the illuminated portion of the object 100 from at least one known position and orientation. In the embodiment shown in FIG. 1, two cameras 103, 105 are employed, which preferably substantially simultaneously photograph the illuminated portion of the object 100. Cameras 103, 105 may comprise digital CCD cameras, or conventional film or video cameras from which the resulting 2D images are scanned or otherwise converted to digital form. These images (and all images referenced herein) are preferably saved as digital files in a conventional processor or computer system, where, according to the invention, conventional digital processing and 3D reconstruction are provided.

As illustrated in FIG. 1, at least one white light source 106 may also be employed. The light source 106 illuminates the object 100 and captures its appearance under normal lighting conditions from each camera position. Alternatively, the projector 101 may be employed without a slide to capture images of the object 100 as it appears under the full spectrum of the projector's radiant energy source.

To enhance the accuracy of discerning the pattern features in the resulting images, the images of the object 100 may be captured under the illuminating source of the projector 101 as modulated by each of the three primary colors comprising the pattern. With photographic slides, this can be accomplished by replacing the patterned slide in the projector 101 with uniform primary red, green, and blue slides.

If the cameras 103, 105 are multi-spectral, consisting of the usual three visible bands and three additional infrared bands, and the projector 101 uses the same infrared bands, the white light and patterned images can be captured simultaneously.

A key advantage of the pattern shown in FIG. 2 is that virtually every illuminated point on the object 100 is a uniquely identifiable feature. As a result, it is possible to take any arbitrary grid of points in one image and find the corresponding points in any other image for which any given point is visible.

The "hue-shift tagging" technique will now be described in detail. In the noted technique, the position of a predetermined point in each image indicates the angular offsets of a vector 200 reflecting the direction of the ray from the camera 103 to the point (See FIG. 1). Known angles, in conjunction with the camera 103 orientation (i.e., coordinates), allow one to determine the parameters of the vector 200 from a respective camera position to the point in question. If two cameras 103, 105 are employed, the point where the vectors 202, 200 intersect provides the 3D position of a feature.

Referring now to FIG. 3A, there is shown a conventional color space typically employed in the field of computer graphics. FIG. 3A graphically illustrates how the color at each pixel in a digital image is represented as an RGB (red, green, and blue) triple, the range of which can be visualized as a unit cube. The three primary colors are the unit vectors 302, 304, 306, and the cube contains all the possible values for any given pixel. A similar definition of RGB can be made for images from multi-spectral infrared detectors, wherein R, G and B refer to the responses of each of the three detector bands to the illumination that was projected.

FIG. 3B illustrates how pixel values shown in FIG. 3A can be represented in the HSV (hue, saturation, and value) color space. There are well-known formulae from the field of digital image processing for the translation back and forth between the noted RGB values (which are likely to require gamma correction) and HSV pixel values, which are incorporated by reference herein.

Since the "hue-shift tagging" technique relies on the direct measurement of hues in the color pattern relative to one another, the first step is to determine the originating hue in the pattern at any point in the image from an image of its projection on the object 100. This problem is well known in the field of image processing and color science. It is commonly solved in two parts. The first part involves mapping the RGB values as they appear in a captured image back to the RGB values that are in the projected pattern. The second part comprises conversion from estimated RGB values to their HSV equivalents.

Ideally, the camera response to the light would be directly related to the RGB values printed on a slide. However, in most cases, the RGB response of a given camera to the spectra of light transmitted by a given set of dyes on a slide is an invertible linear transformation of the RGB values used to print the slide. In order to properly measure hue shifts and to estimate the projected hue, the transformation values must be estimated. For objects that have color variations over their surfaces, the transformation will have a different value at each point in each image. One way to solve this problem is to compute the transformation at each point from data about the measured response to each of the three primary colors in the projected pattern. All the necessary data is available for this computation if the individual primary color slides are employed as described above.

However, in most cases, a single white light image will suffice to provide the needed transformation values at each pixel. In this case, an heuristic approach is applied, based on previously obtained data correlating white light RGB values to the corresponding transformation matrices obtained via the complete primary color data described in the previous paragraph.

Figure 4A:
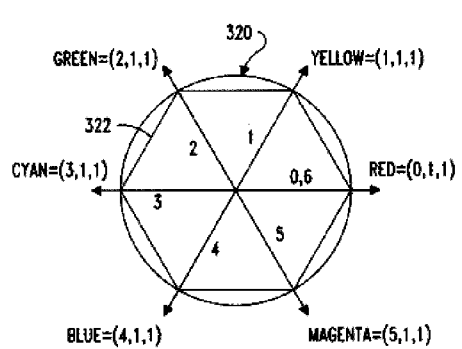
FIG. 4A is a plan view of a hue-wheel that results when all the HSV colors in the space shown in FIG. 3B are considered only for their hue and saturation, with the common division of the circle into its 6 additive and subtractive primary colors.

Referring now to FIG. 4A, there is shown a plan view of a substantially hexagonal hue wheel 320 which is known. FIG. 4A graphically illustrates how the values in the HSV hex-cone shown in FIG. 3B can be projected out to the base 322 of the cone 324 along a line (denoted by arrow V) from the apex 326 of the cone 324, resulting in the hexagonal hue wheel 320. In the noted embodiment, the hue wheel 320 reflects hue and saturation only, and, preferably, independently of the value of V. Hue is also represented by the direction from the center of the hue wheel 320 to the color in question, and saturation by its distance from the center.

According to the invention, the color pattern is coded via a division of the hue wheel 320 into substantially equal parts, with a divisor in the optimal range of 3 to 16. As illustrated in FIG. 4A, the hue wheel 320 can be divided into six substantially equal parts, covering the common additive and subtractive primary colors: red, yellow, green, cyan, blue, and magenta. In FIG. 4C the hue wheel 330 has been divided into eight substantially equal parts.

According to the invention, for a hue wheel divided into N parts, there are N-1 possible "hue shifts", which are given integer values from 1 to N-1. A "hue-shift" as used herein is defined as the number of steps to take counter-clockwise around the partitioned hue wheel to go from one hue to the next and is preferably>0. When using standard formulae for HSV conversion, the integer value is scaled so that N represents the entire extent of the hue wheel (commonly defined as 6 or 360 in the literature).

To measure the vertical position of illuminated points relative to the pattern, there may be a functional variation of hue in the vertical direction. If there is no variation, the pattern will have bands of uniform color, and the ability to discern the vertical position of features is lost. When the horizontal direction in the projection is the same as that of the epipolar lines between two images being considered, this vertical information is not necessary. It is, however, preferable to have the means to measure it.

Figure 4B:
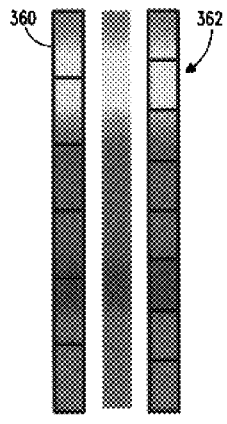
FIG. 4B illustrates a cyclical hue ramp where the entire vertical extent of the ramp corresponds to one revolution around the hue wheel, according to the invention.
Figure 4C:
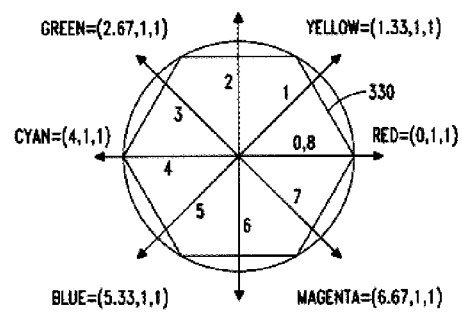
FIG. 4C is a plan view of the hue wheel illustrating the colors chosen for the customized division into 8 hues.
Figure 5A:
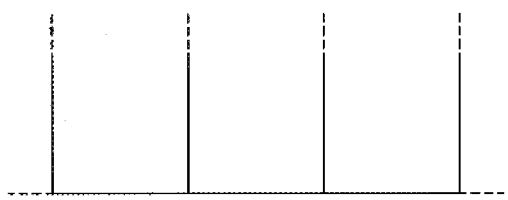
FIGS. 5A–5F illustrate various horizontal intensity value functions that can be employed within a band, according to the invention.
Figure 5B:
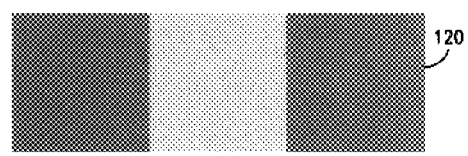
Figure 5C:
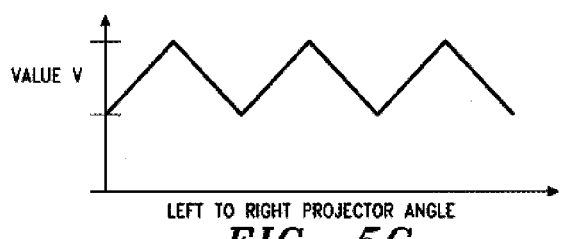
Figure 5D:
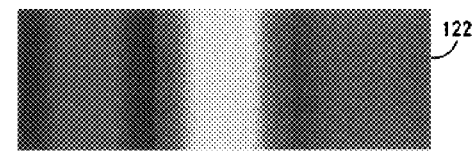
Figure 5E:
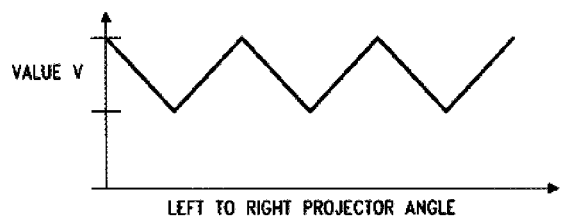
Figure 5F:
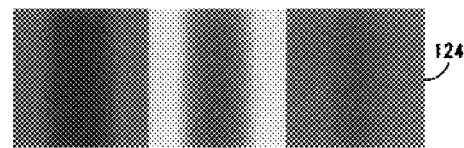

The most basic variation is a simple linear ramp in hue, which leads a rainbow-like stripe as shown in FIG. 4B. The grid lines illustrate the equal divisions of the hue ramp into six (360) or eight (362) parts.

Since common representations of hue in computer graphics all lead to a wheel that repeats itself, it is quite normal for functions of hue to repeat themselves cyclically when extended. The ramp shown in FIG. 4B illustrates one such cycle. According to the invention, if extended vertically in either direction, it would begin to repeat itself.

According to the invention, any function of hue is viable in the vertical direction, including one that maps hues to wavelengths of light, making it possible to use linear variable wavelength filters to piece together the pattern. Various U.S. patents disclose means for measuring the wavelength of light from pixel values in acquired images. Illustrative is U.S. Pat. No. 5,675,407, which is incorporated by reference herein.

To better measure the horizontal position of features within a band, the pattern may employ a varying function of intensity as the band is traversed horizontally. Since hue and value are treated independently in HSV space, they can serve to pinpoint positioning in two independent directions, down to a fraction of a pixel in each direction.

FIG. 5 shows some horizontal intensity value functions that can be used within each band. The first intensity value function 120 uses a uniform function at full value. Intensity value function 122 is preferably a linear ramp from 0.5 at the band boundaries to 1.0 at its center. Intensity value function 124 is a linear ramp from 1.0 at the band boundaries to 0.5 in the center. According to the invention, the pinpointing of horizontal position is accomplished by locally comparing relative intensity values.

Figure 6:
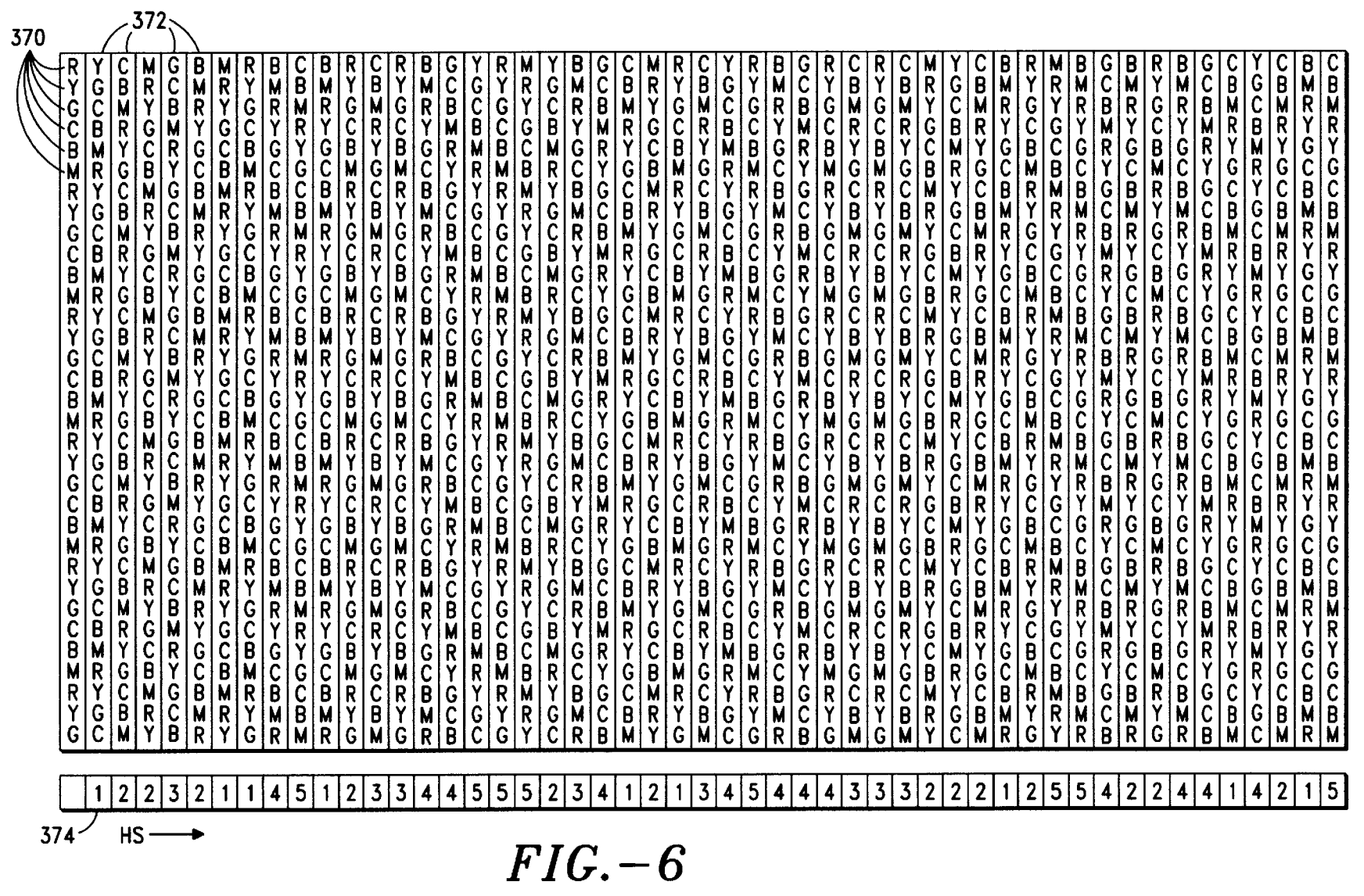
Figure 7:
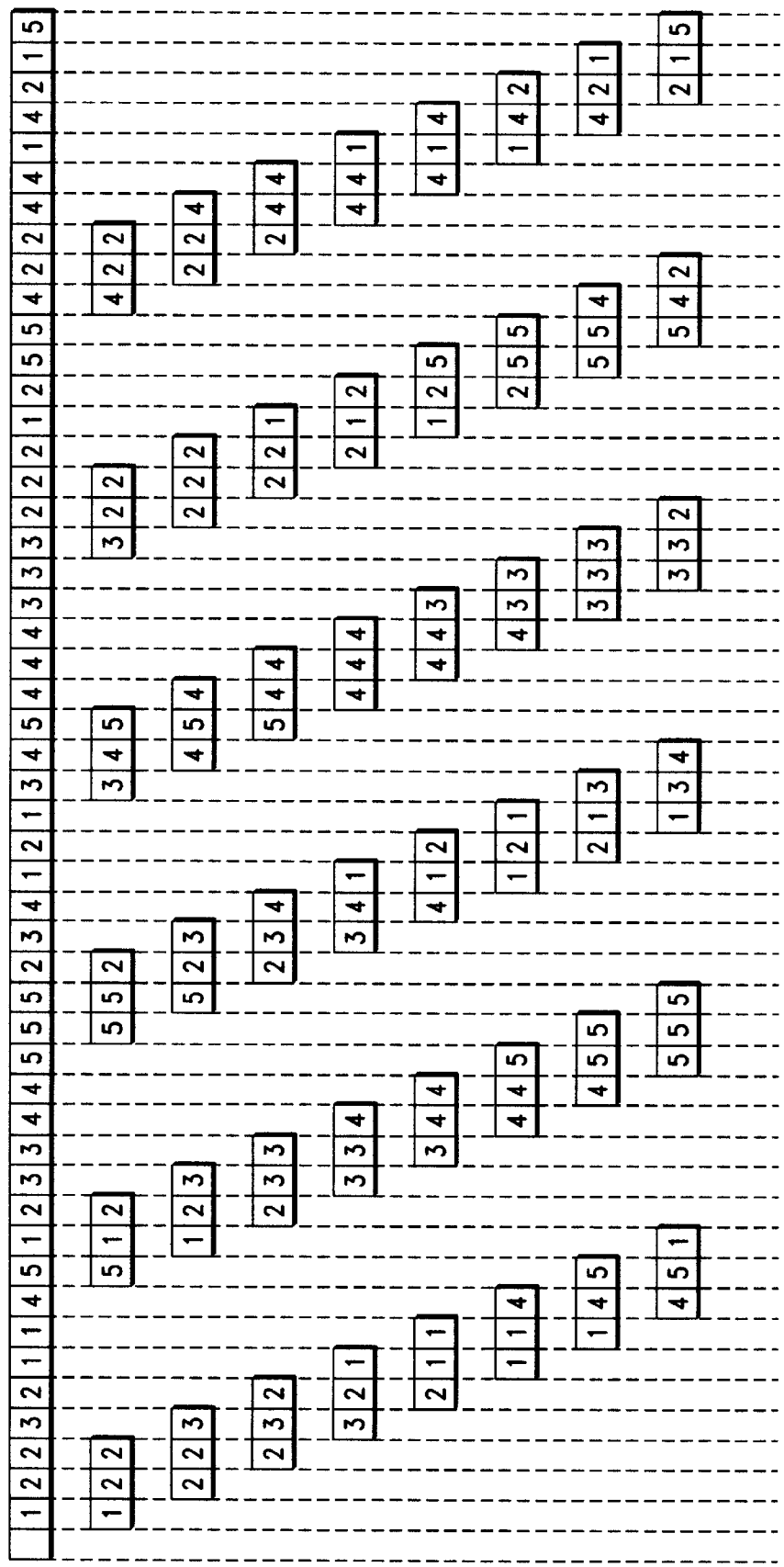
FIG. 7 is a schematic illustration demonstrating hue-shift tags according to the invention.

FIG. 6 and FIG. 7 illustrate schematically how "hue-shift tagging" works between bands. Referring to FIG. 6, vertical hue ramps 370 are indicated by the sequence of letters R, Y, G, C, Be and M representing the colors red, yellow, green, cyan, blue, and magenta, respectively. Each vertical band 372 is preferably a substantially continuous hue ramp, having a distinctive series of "hue-shifts" between bands going horizontally across the image. The hue-shifts from one band to the next, in the direction denoted by Arrow HS, with the hue wheel partitioned into 6 hues, is denoted generally 374.

FIG. 7 illustrates the resulting tags (denoted generally 378) for the pattern 371 shown in FIG. 6 where the length of a tag 378 is chosen at 3. As illustrated in FIG. 7, in a preferred embodiment, each tag 378 combination occurs only once in the entire pattern.

According to the invention, the sequence of hue shifts can be generated by either pseudo-random or deterministic pattern techniques. If the number of hues is N and the length of a tag is T, there are $(N-1)^T$ distinct tags, yielding a sequence of up to $(N1)^T+T$ bands. For example, if N is 6 and T is 3, the pattern can have up to 128 vertical strips. When the bands are allowed to have uniform color, the color of the respective band can be incorporated into a tag, increasing the number of uniquely taggable strips in the pattern.

Once the sequence of hue-shifts are generated, the hue-shifts are summed substantially horizontally across the image, modulo N, to yield the absolute shift value that will be applied to the hue function in that strip. The strip is hue-shifted accordingly (by adding that absolute hue-shift value to the hue of each point in the strip, modulo N, and then using the resulting hue), and the complete pattern is generated.

Since each tag is unique to the whole pattern, and can be identified by studying the hue-shifts in a local neighborhood of the projection at any given pixel of an image, the pattern provides a way to correlate illuminated points on a surface with those from any other camera view under the same projector lighting.

To make the pattern easier to identify in the images, it is possible to correct for the object's coloration by comparing the RGB values of each pixel under the projection with their corresponding values under white light, applying well-known digital color balancing techniques. The white light image also provides color information to map onto the 3-D model once it has been scanned, and the exact mappings are already known as a result of the processing required to compute the 3D surface positions.

The 3D surface positions are preferably computed using techniques common to those skilled in the art of digital image processing and computer vision. Precise horizontal and vertical positions within a projected band are found by comparing the computed hue and value from the projection at each pixel with those at the pixels in its local vicinity. The unique identity of the band is found by examining a somewhat larger area, using edge-detection in hue space to locate the boundaries of neighboring bands, and measuring the hue-shifts across these boundaries to determine the tag on the band, which identifies it uniquely.

The band identity, along with the precise local horizontal and vertical positions within the band, provide enough information to compute the parameters of the camera-topoint vector 200 for any desired pixel, and sub-pixel accuracy can be obtained via mathematical filtering. The common technique of triangulating these vector parameters, either between multiple views showing the same point, or by precise calibration of the projected pattern's distribution in space against a single view, is now possible. This triangulation provides the 3D surface measurement at each point.

The unique color pattern 104 shown in FIG. 2 has all the described features of the present invention: the tags defined by hue-shifts between bands, a functionally varying hue in the vertical direction, and a functionally varying intensity value as each band is traversed horizontally. Other embodiments of the pattern may have wider or narrower bands, gentler or steeper hue ramps, different functions of hue in the vertical direction or value in the horizontal direction, more or fewer possible hue-shifts according to the number of hues that are chosen for partitioning the wheel, and a smaller or larger number of shifts to define a single tag.

In some instances, it may also be preferable to incorporate a hue shift tagging in the substantially vertical direction of the pattern by a patterned shifting of the hue over some small designated sections of the bands as they are traversed vertically. This may be accomplished in addition to the horizontal tagging described herein.

In additional envisioned embodiments, the pattern is scan printed on a large poster for the purpose of measuring the geometric distortion of camera lenses. In these embodiments, the poster is photographed with the lens to be analyzed, and the relative position of the pattern features in the resulting digital image serve as a precise measure of the amount of lens distortion occurring at each point in the image.

In yet additional envisioned embodiments, the pattern is printed onto stretch fabric which is fashioned into clothing for the purpose of the digital capture of the shape and movement of the person wearing the clothing.

In yet additional envisioned embodiments, known or derivable information about the 3D shape and position of the object in question is statistically fit to a new image, acquired with either an unknown camera or projector position and orientation, and enabling the determination of the device in question's positioning.

One use of this method would be to start with one known positioning to acquire the shape of the object, and then to move a camera and a projector one item at a time in a leapfrog fashion, acquiring images every step of the way. This provides a way to automatically piece together many individually scanned sections of the object, allowing the entire object can be scanned.

In yet further envisioned embodiments, the pattern is rotated on its side and projected in this configuration, changing the nature of the computer vision pair matching to better accommodate objects lacking smooth continuous surfaces.

Without departing from the spirit and scope of this invention, one of ordinary skill in the art can make various changes and modifications to the invention to adapt it to various usages and conditions. As such, these changes and modifications are properly, equitably, and intended to be, within the full range of equivalence of the following claims.

What is claimed is:

1. A method for determining the three-dimensional characteristics of an object, comprising the steps of:

illuminating at least a surface portion of said object with radiant energy, said radiant energy being directed through a color pattern to provide a first color image, said color pattern including a plurality of substantially vertical color strips, each of said color strips having varying hue;

obtaining at least one first two-dimensional image of said illuminated surface portion of said object at a first position, said illuminated surface portion including said first color image;

illuminating said surface portion of said object with a second light, said second light comprising substantially white light, said second light providing a second light image;

obtaining at least one second two-dimensional image of said surface portion of said object illuminated by said second light, said two-dimensional image being obtained at said first position;

determining the originated hue in said color pattern at a plurality of points in said first color image;

determining a tag for each of said points in said color image;

determining the position of each of said points on a respective one of said tags, and triangulating said point positions to generate a three-dimensional model of said surface portion of said object.

2. The method of claim 1, wherein each of said vertical color strips comprises a plurality of different colors.

3. The method of claim 1, wherein said varying hue varies substantially linearly.

4. The method of claim 3, wherein said varying hue cycles substantially linearly.

5. The method of claim 1, wherein said first and second images are obtained with a digital camera.

6. The method of claim 1, wherein said second light comprises substantially infrared light.

7. The method of claim 1, wherein said second light is multi-spectral.

8. The method of claim 1, including the step of re-mapping said second light image onto said three-dimensional model.

9. An apparatus for determining the three-dimensional characteristics of an object; comprising:

at least one projector means for illuminating at least a surface portion of said object with radiant energy to provide a first surface image;

a first color pattern, said first color pattern including a plurality of substantially vertical strips, each of said color strips having varying hue;

at least one light projection means for illuminating said surface portion of said object to provide a second surface image;

at least one two-dimensional image sensor means for obtaining said first and second surface images;

means for determining the originated hue in said color pattern at a plurality of points in said first surface image;

means for determining a tag for each of said points in said first surface image;

means for determining the position of each of said points on a respective one of said tags; and means for triangulating said point positions to generate a three-dimensional model of said surface position of said object.

* * * * *